May 1, 1934.     F. G. BAUM     1,956,973
BEARING
Filed May 31, 1930
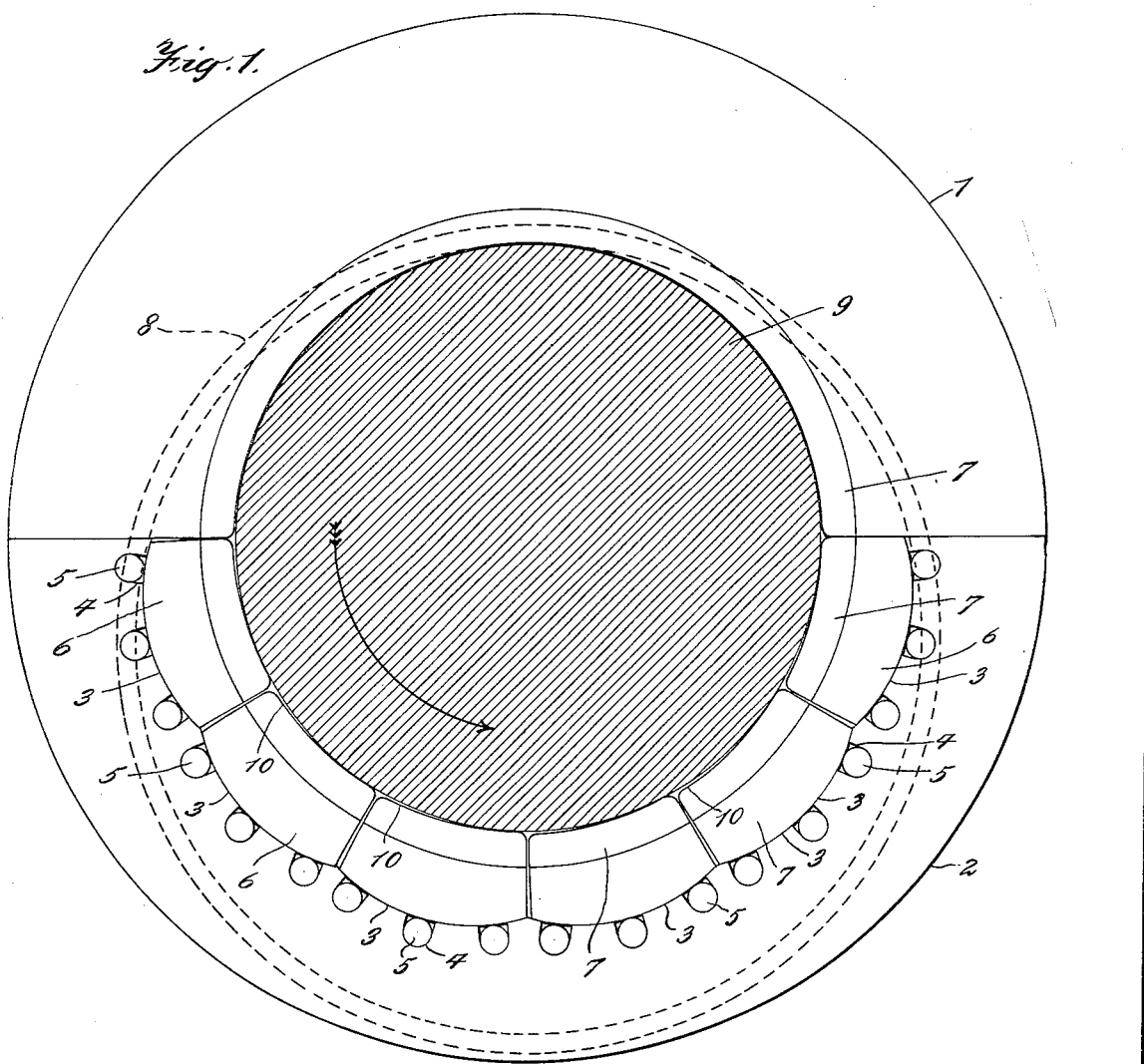
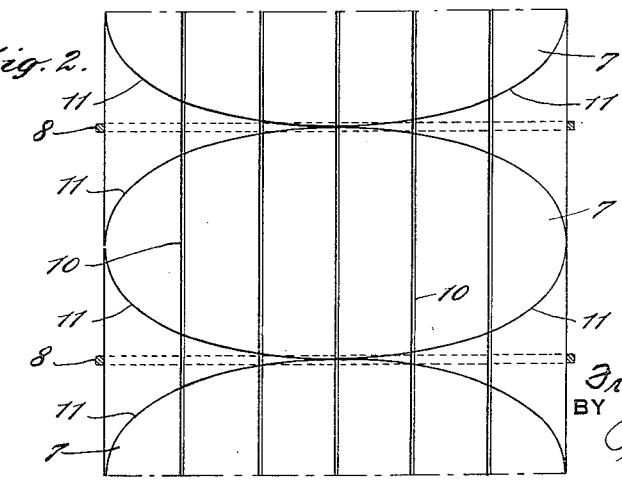
INVENTOR
Frank G. Baum
BY
Victor D. Borst
ATTORNEY Patented May 1, 1934

1,956,973

UNITED STATES PATENT OFFICE 1,956,973

BEARING

Frank G. Baum, Cassel, Calif.; Esther F. Born executrix of said Frank G. Baum, deceased Application May 31, 1930, Serial No. 458,316

17 Claims. (Cl. 308—73)

My invention has especial application to bearings in which the force opposed by the bearing is not distributed uniformly over the surface of the bearing. An example of such a bearing is the ordinary cylindrical or journal bearing in which the force acting upon the bearing surface varies from a maximum along one line, depending upon the direction of application of the load supported by the bearing, to zero at right angles to the line of application of the maximum force. This uneven distribution of the force resisted by the bearing is not conducive to the production of a continuous film of oil between the surface of the bearing and the surface resting thereon as the pressure exerted between the surfaces in sliding contact acting to force the oil out from between the surfaces varies from point to point and the result is that although a film of oil is formed at the points of least pressure it is squeezed out from between the surfaces at or before the point of maximum pressure.

A further disadvantage of this uneven distribution of forces over the surface of the bearing is the fact that the bearing surface is worn unevenly. In the common cylindrical bearing, the bearing surface wears so that the bearing appears elliptical in cross section. This uneven wearing of the bearing surface is objectional because it materially shortens the period over which the bearing may be used before it must be replaced or repaired.

By my invention, I am enabled to obtain a continuous film of oil between the surface of the bearing and the surface sliding thereon, and I am also enabled to obtain a uniformly wearing curved bearing in which the forces acting on the bearing surface vary angularly about the bearing. I employ a construction in which the bearing is divided longitudinally thereof to form a section which is movable about an axis parallel to the longitudinal axis of the bearing and lying inside of the bearing surface. The section so formed is caused to move about its axis by the rotation of the shaft in the bearing, and when so moved, there is formed, by the inner surface of the movable section and the surface of the shaft, a substantially wedge-shape slot, the base of which is to the rear relative to the direction of rotation of the shaft. Oil delivered to the surface of the shaft is delivered to the base of this wedge shaped slot and a continuous film of oil is formed between the surface of the bearing and the surface of the shaft.

In order to increase the efficiency of the movable section of the bearing lining and to cause the bearing surface to wear uniformly, I cut out portions of the bearing surface, the cut-out portions being such that the distance between the edges thereof increases from the line at which the force exerted upon the bearing surface is a maximum to the line at which it is a minimum or zero. By cutting out portions of the bearing surface in this way, I obtain a surface over which there is uniform wearing force per unit of area.

Specifically, I provide an outer or main bearing shell similar to those in common use. The inner surface of the shell is formed with one or more longitudinal depressions which are arcuate in cross section. These arcuate depressions are eccentric to the bearing and have a lesser radius of curvature than the inner surface of the shaft. Received within each of these arcuate depressions, there is a movable section which is free for limited angular movement. The outer surfaces of these sections are complementary to the surfaces of the arcuate depressions in the shell. Oil may be delivered to the surface of the shaft journaled in the bearing and the inner surface of the bearing by any known means, such for example, as oil rings which carry the oil from an oil sump to the top of the shaft. Rotation of the shaft will draw the oil with it and due to the adhesion of the oil to the journal and because of its viscosity or resistance to flow, the movable sections of the soft metal lining will be drawn in the direction of rotation of the shaft. The movable sections of the lining slide along the surface of the arcuate depressions in which they are received and are caused, in effect, to rotate through a very small angle about the axis of the arcuate depressions. This movement of the sections forms, between the inner surface thereof and the surface of the shaft, substantially wedge-shape slots, the bases of which are to the rear relative to the direction of rotation of the shaft so that the oil may enter the slots in a thick film.

In order to make the action of the movable sections uniform and to equalize the wear of the bearing surface, I cut out portions of the bearing surface, the cut-out portions being transversely of the bearings and the edges thereof forming sine curves. By varying the contact area of the bearing surface in accordance with the sine of the angle, the bearing force per unit of area is equalized and the surface wears uniformly. These cut-out portions also form oil grooves through which oil may be distributed to the wedge shape slots formed by the movable sections.

I shall now describe in detail the embodiment of my invention which is illustrated in the accompanying drawing in which:

Fig. 1 is a transverse section of a bearing embodying my invention; and

Fig. 2 is a development, on reduced scale, of a lower half of the bearing shown in Fig. 1.

The bearing illustrated in the drawing consists of an outer shell which is separable into two parts 1 and 2 longitudinally thereof on a horizontal plane containing the center of the bearing. The inner surface of the lower half 2 of the bearing shell is of a greater diameter than the upper half 1, and is provided with a series of longitudinal depressions 3 which are arcuate in cross section. The radius of curvature of the surfaces of the longitudinal depressions is less than the radius of curvature of the inner surfaces of the bearing and the axis about which depressions are struck lie on the inside of the bearing surface, that is, within the space in which a shaft is received. In these depressions, grooves 4 are formed in which rollers 5 are placed. A plurality of sections 6 of sector-shape in cross section are provided, the inner surface of these sections being concentric with the inner surface of the upper part 1 of the bearing shell. The outer surface of the sections 6 are complementary to the surfaces of the depressions 3 in the lower half of the bearing shell and are received therein, and rest upon the rollers 5 in the grooves 4; the rollers 5 constitute roller bearings; ball bearings may also be used. Between each of these sections, there is a space so that the sections are free for limited angular movement.

The shell so formed is provided with a metal lining 7 such for instance as babbit. Transverse slots are cut in the upper portion of the bearing so that oil rings 8 may rest upon the surface of the shaft 9 journaled in the bearing. The oil rings 8 deliver oil to the shaft and the surface of the bearing lining from an oil sump in a manner well known in the art. Rotation of the shaft draws the oil with it and due to the adhesion of the oil to the inner surface of the metal lining and its viscosity or its resistance to flow, the sections 6 are drawn in the direction of rotation of the shaft. This tendency of the sections 6 to rotate with the shaft is translated, by virtue of the curved surfaces of the depressions 3 and the complementary outer surfaces of the sections 6, into movement about the axes of the arcuate depressions in which they are received. Movement of the sections 6 about the axes of the arcuate depressions 3 forms, between the inner surfaces thereof and the surface of the shaft, a substantially wedge-shaped slot 10. As shown in Figure 1, in which the shaft is indicated as rotating in the direction of the arrow, the bases of the wedge-shaped slots 10 are to the rear relative to the direction of rotation of the shaft. Oil carried by the shaft or delivered to the inner surface of the bearing through oil grooves is, therefore, drawn into these wedge-shaped slots 10 and forms a continuous film of oil between the surface of the shaft and the surface of the bearing.

It is to be noted that irrespective of the direction of rotation of the shaft the bases of the wedge-shaped slots formed between the surface of the shaft and the surface of the sections will always be to the rear relative to the direction of rotation of the shaft. Thus, the wedges automatically assume the proper position for obtaining a continuous film of oil between the contacting surfaces. This reversible feature of the sections is accomplished by locating the axes of the depressions within the space in which the shaft is received.

In order to obtain the best results it is preferable that the bearing surface be such that the bearing weight is equal per unit of area of the bearing surface. In curved bearings such as the cylindrical bearing shown, the force acting upon the bearing surface varies from a maximum in one radial plane, depending upon the direction of application of the forces acting upon the shaft journaled in the bearing, to zero in another direction at an angle to the direction of application of the maximum force. Thus, in the cylindrical bearing shown wherein the force exerted is the weight of the shaft and acts vertically downward, the force on the bearing surface is maximum along a line at the bottom of the bearing and is zero at the sides of the bearing. This variation in the force exerted upon the bearing surface is not conducive to uniform action of the movable sections 6, and causes uneven wear of the bearing, thereby shortening the useful life of the bearing. To avoid this uneven wear of the bearing and to increase the efficiency of the sections 6, portions of the bearing surface are cut away. These portions are cut out transversely of the bearing and the edges 11 thereof form sine curves as shown in Fig. 2. By cutting out portions of the bearing surface in this way, the area of the surface varies in accordance with the variation in the force acting upon the bearing surface and there is obtained a surface upon which the force is equal per unit of area of bearing surface.

It is of course to be understood that the bearing surface will be cut away on either side of the line along which the maximum force is exerted. Thus, if there is more than a single force acting upon the shaft in the bearing, the forces will be combined and the cut away portions will be on either side of the line of application of the resultant of all the forces acting upon the shaft. It is also true that the number of cut-out portions is immaterial and entirely discretional with the maker of the bearing. It is, however, advisable to place the oil ring over the center of the cut-out portions for these cut-out portions act as oil grooves and serve to distribute the oil to the bearing surface and to the base of the wedge-shape slots formed by the sections.

It is obvious that various changes may be made in the embodiment illustrated and above particularly described within the principle and scope of my invention as expressed in the appended claims.

I claim:

1. In a cylindrical bearing in which the force exerted on the bearing surface varies angularly about the bearing, a bearing surface having cut-out portions, the edges of which form approximate sine curves.

2. A cylindrical bearing in which the force exerted by a shaft journaled in the bearing varies angularly about the bearing, a shell having a plurality of longitudinal, arcuate depressions in its inner surface, the arcuate depressions being eccentric to the inner surface of the shell and to each other, a bearing surface having cut-out portions, the edges of which form sine curves, and the axis of said depressions in the shell lying within the cylinder formed by the bearing surface, a plurality of sections free for limited angular movement in the arcuate depressions in the inner surface of the shell, the outer surfaces of the sections being complementary to the surfaces of the arcuate depressions and the inner surfaces thereof constituting portions of the bearing surface, and means for delivering oil to the bearing surface at a point to the rear of the sections relative to the direction of rotation of a shaft in the bearing.

3. A bearing comprising a plurality of sections, one of which is free for limited movement about an axis lying on the inside of the bearing surface for forming a substantially wedge-shape slot between the inner surface thereof and the surface in sliding contact therewith, the base of the wedge-shape slot being to the rear relative to the direction of movement of the surface in contact with the bearing.

4. A bearing comprising a plurality of movable sections, each of which is free for limited angular movement about an axis lying on the inside of the bearing surface for forming a substantially wedge-shape slot between the inner surface thereof and the surface in sliding contact therewith, the base of the wedge-shape slot being to the rear relative to the direction of movement of the surface in contact with the bearing.

5. A bearing comprising a shell having an arcuate depression in its inner surface, the axis of which lies on the inside of the bearing surface, and a section free for limited angular movement in the arcuate depression in the inner surface of the shell, the outer surface of the movable section being complementary to the surface of the arcuate depression in the surface of the shell and the inner surface constituting a portion of the bearing surface.

6. In a curved bearing in which the force exerted on the bearing surface varies angularly about the bearing, a bearing surface including a portion extending the length of the bearing, and a portion on each side of said full length portion, said latter portions being progressively shorter in length in proportion to the sine of the angle between the normal to the surface of the full length portion and the normal to the surface on each side of the full length portion.

7. In a cylindrical bearing in which the force exerted on the bearing surface varies angularly about the bearing, a bearing surface including a portion extending the full length of the bearing, and a portion on each side of the full length portion and extending circumferentially ninety degrees therefrom, said latter portions being progressively shorter in length in proportion to the sine of the angle between the normal to the surface of the full length portion and the normal to the surface on each side of the full length portion.

8. A bearing comprising a bearing shell, a plurality of sections mounted within the shell, each section forming a portion of the bearing surface and being shiftable in accordance with and in the direction of the movement of a surface in sliding contact therewith, and means for translating movement of the sections into movement inclined to the surface in sliding contact therewith for forming a wedge-shape slot between the bearing surface of the section and the surface in sliding contact therewith.

9. A bearing comprising a bearing shell having an arcuate depression in its inner face, and a section forming a portion of the bearing surface mounted in said arcuate depression and being shiftable therein in accordance with the movement of a surface in sliding contact therewith, the arcuate depression in the bearing shell being of a lesser radius of curvature than the bearing surface of the section mounted therein and the axis thereof lying on the same side of the bearing surface as the axis of the bearing surface.

10. A bearing comprising a bearing shell having a series of arcuate depressions in its inner surface, and a bearing section in each of said depressions, one side of each section being complementary to the arcuate depression in the bearing shell and the other side forming a portion of the bearing surface and the several sections being shiftable in the depressions in accordance with the movement of a surface in sliding contact therewith, the depressions in the bearing shell being of a lesser radius of curvature than of the bearing surface and the axis of the depressions lying on the same side of the bearing surface as the axis of the bearing surface.

11. A bearing comprising a cylindrical bearing shell having an arcuate depression in its inner surface, the radius of curvature of the depression being less than the inner surface of the bearing shell and the axis thereof lying on the same side of the inner surface of the shell as the axis thereof, and a bearing section mounted within the arcuate depression having one side thereof complementary to the curvature of the depression and the other side forming a portion of the bearing surface, said section being freely mounted within the depression in the shell for movement in accordance with the movement of a surface in sliding contact therewith.

12. A bearing comprising a curved bearing shell, a bearing surface including a portion extending the length of the bearing, and a portion progressively shorter in length in proportion to the angular displacement from said full length portion, a bearing section mounted within the bearing shell and forming a part of the bearing surface said section being shiftable in accordance with and in the direction of the movement of a surface in sliding contact therewith, and means for translating movement of the section into movement inclined to the surface in sliding contact therewith for forming a wedge-shape slot between the bearing surface of the section and the surface in sliding contact therewith.

13. A bearing comprising a cylindrical bearing shell having an arcuate depression in its inner surface, the radius of curvature of the depression being less than the inner surface of the bearing shell and the axis thereof lying on the same side of the inner surface of the shell as the axis thereof, a bearing surface including a portion extending the length of the bearing, and a portion on either side of the full length portion, said latter portions being progressively shorter in length in proportion to the angular displacement from said full length portion, and a bearing section mounted within the arcuate depression having one side thereof complementary to the curvature of the depression and the other side forming a portion of the bearing surface, said section being freely mounted within the depression for movement in accordance with the movement of a surface in sliding contact therewith.

14. A bearing comprising a bearing shell, a section forming a portion of the bearing surface mounted within the shell, said section being shiftable in accordance with and in the direction of the movement of a surface in sliding contact therewith, and means for translating movement of the section into movement inclined to the surface in sliding contact therewith for forming a wedge-shape slot between the bearing surface of the section and the surface in sliding contact therewith, the base of the slot so formed being to the rear relative to the direction of movement of the surface in sliding contact with the bearing.

15. In a curved bearing in which the force exerted on the bearing surface varies angularly about the bearing, a bearing surface including a full length portion, and a portion extending circumferentially of the bearing and being progressively shorter in length in proportion to the arcuate distance from said full length portion.

16. In a curved bearing in which the force exerted on the bearing surface varies angularly about the bearing, a bearing surface including a full length portion, and a portion on each side of said full length portion, said latter portions being progressively shorter in length in proportion to the arcuate distance from said full length portion.

17. In a cylindrical bearing in which the force exerted on the bearing surface varies angularly about the bearing, a bearing surface including a full length portion and a portion on each side of the full length portion and extending circumferentially 90° therefrom, said latter portions being progressively shorter in length in proportion to the arcuate distance from said full length portion.

FRANK G. BAUM.